US009575744B2

(12) United States Patent
Katkere et al.

(10) Patent No.: US 9,575,744 B2
(45) Date of Patent: Feb. 21, 2017

(54) LIVE UPDATING OF A SHARED PLUGIN REGISTRY WITH NO SERVICE LOSS FOR ACTIVE USERS

(71) Applicant: Oracle International Corporation, Redwood Shores, CA (US)

(72) Inventors: Arun Lakshminarayn Katkere, Saratoga, CA (US); Bo Jonas Birger Lagerblad, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 14/866,414

(22) Filed: Sep. 25, 2015

(65) Prior Publication Data
US 2016/0092204 A1 Mar. 31, 2016

Related U.S. Application Data

(60) Provisional application No. 62/056,425, filed on Sep. 26, 2014, provisional application No. 62/079,363, filed on Nov. 13, 2014.

(51) Int. Cl.
*G06F 9/44* (2006.01)
*G06F 9/445* (2006.01)

(52) U.S. Cl.
CPC . *G06F 8/67* (2013.01); *G06F 8/71* (2013.01); *G06F 9/44526* (2013.01); *G06F 8/65* (2013.01); *G06F 8/68* (2013.01)

(58) Field of Classification Search
CPC ............... G06F 8/61; G06F 8/65; G06F 8/67; G06F 8/68; G06F 8/71
See application file for complete search history.

(56) References Cited

U.S. PATENT DOCUMENTS 7,140,012 B2 * 11/2006 Pugh .................. G06F 8/71
717/170
7,155,712 B2 12/2006 Takimoto
(Continued)

FOREIGN PATENT DOCUMENTS

EP 1405172 4/2004
WO 02097610 A1 12/2002
(Continued)

OTHER PUBLICATIONS

Giuffrida et al., "Safe and automatic live update for operating systems", ACM, ASPLOS'13, Mar. 2013, pp. 279-292; <http://dl.acm.org/citation.cfm?id=2451147&CFID=678227648&CFTOKEN=30012962>.*
(Continued)

*Primary Examiner* — Thuy Dao
*Assistant Examiner* — Ben C Wang
(74) *Attorney, Agent, or Firm* — Kilpatrick Townsend and Stockton LLP

(57) ABSTRACT

Embodiments can enable the uploading of a newer version of a plugin package to a plugin service without affecting an existing user session that is using an older version of the plugin package. When a new user session begins, the plugin service can monitor one or more plugin packages and the versions used during the new user session. Throughout the user session, the plugin service continues to make the plugin packages available to the user regardless of newer versions being uploaded to the plugin service. In the meantime, multiple clients with different user sessions may be using different and possibly newer versions of the plugin packages at the same time. The plugin service can remove an older version of a plugin package when it determines that there are no longer any active user sessions utilizing the older version of the plugin package.

20 Claims, 9 Drawing Sheets

(56) References Cited

U.S. PATENT DOCUMENTS

| | | | |
|---|---|---|---|
| RE42,685 E | 9/2011 | Oesterreicher et al. | |
| 8,095,885 B1* | 1/2012 | Schendel | G06F 3/0481 715/735 |
| 8,595,715 B2 | 11/2013 | Ward et al. | |
| 8,662,992 B2 | 3/2014 | Bibbey et al. | |
| 9,009,696 B2* | 4/2015 | Vidal | G06F 8/65 717/169 |
| 2003/0187929 A1* | 10/2003 | Pugh | G06F 8/71 717/170 |
| 2005/0257093 A1* | 11/2005 | Johnson | G06F 8/67 714/38.13 |
| 2005/0278279 A1* | 12/2005 | Petev | G06F 8/65 707/999.001 |
| 2006/0200817 A1* | 9/2006 | Callender | G06F 9/4411 717/170 |
| 2010/0332633 A1* | 12/2010 | Keys | G06F 8/68 709/223 |
| 2010/0332634 A1* | 12/2010 | Keys | G06F 8/65 709/223 |
| 2010/0333080 A1* | 12/2010 | Keys | G06F 8/68 717/171 |
| 2010/0333082 A1* | 12/2010 | Keys | G06F 8/68 717/173 |
| 2011/0126192 A1* | 5/2011 | Frost | G06F 8/61 717/178 |
| 2011/0265073 A1* | 10/2011 | Vidal | G06F 8/65 717/170 |
| 2012/0079383 A1* | 3/2012 | Thanumalayan | G06F 9/4443 715/716 |
| 2014/0040874 A1 | 2/2014 | Wilson et al. | |
| 2014/0047429 A1 | 2/2014 | Gaither et al. | |
| 2014/0282471 A1* | 9/2014 | Chaney | G06F 8/65 717/170 |
| 2014/0310699 A1* | 10/2014 | Wu | H04L 51/04 717/170 |
| 2015/0128105 A1* | 5/2015 | Sethi | G06F 8/36 717/106 |
| 2015/0286489 A1* | 10/2015 | Brown, Jr. | G06Q 30/0621 717/178 |
| 2016/0092204 A1* | 3/2016 | Katkere | G06F 8/67 717/170 |

FOREIGN PATENT DOCUMENTS

| | | |
|---|---|---|
| WO | 2009135409 A1 | 11/2009 |
| WO | 2013138895 A1 | 9/2013 |

OTHER PUBLICATIONS

Zhang et al., "Live Code Update for IoT Devices in Energy Harvesting Environments", IEEE, Aug. 2016, pp. 1-6; <http://ieeexplore.ieee.org/stamp/stamp.jsp?tp=&arnumber=7547182>.*

Călin Iorgulescu, "Safe and Automatic Live Update for Unix Application", Vrije University Amsterdam, Aug. 2013, pp. 1-41; <http://www.minix3.org/theses/Calin_Iorgulescu_Master_Thesis.pdf>.*

Protege 4 Auto Update retrieved from http://protegewiki.stanford.edu/wiki/EnablePluginAutoUpdate on Apr. 23, 2015, 4 pages.

* cited by examiner

LIVE UPDATING OF A SHARED PLUGIN REGISTRY WITH NO SERVICE LOSS FOR ACTIVE USERS

CROSS-REFERENCES TO RELATED APPLICATIONS

This application is a non-provisional application and claims the benefit and priority of U.S. Provisional Application No. 62/056,425, filed on Sep. 26, 2014, titled "LIVE UPDATING OF A SHARED PLUGIN REGISTRY WITH NO SERVICE LOSS FOR ACTIVE USERS," and U.S. Provisional Application No. 62/079,363, filed on Nov. 13, 2014, titled "VISUAL ANALYZER SYSTEM," both of which are herein incorporated by reference in their entirety for all purposes.

BACKGROUND

Performing updates to versions of a software presents significant challenges. For example, pushing out software updates to the various clients typically requires the clients to end and restart their current session in order for the software to continue functioning properly, which is disruptive for existing users in an active session. Further, the users may not want to use an updated version of the software where changes have been made to the software while the users are currently in an active session. It is undesirable for the software to suddenly appear different and inconsistent to the user while the user is still in the middle of the session. Moreover, it is inconvenient and inefficient, if not impossible at times, to wait until there are no existing user sessions using a current version of the software push out the software updates.

SUMMARY

The present disclosure relates to computing systems and more specifically to techniques for managing software updates. Certain embodiments are described that greatly reduce or eliminate the problems associated with service loss for users using a previously existing version of software.

In certain embodiments, techniques (including systems, devices, methods, code or program instructions executed by one or more processors) are provided for enabling the upload of new plugin packages (e.g., an updated version of a plugin package) to a plugin service without affecting an existing user session that is using a previously existing version of a plugin package. Some embodiments may monitor a reference count associated with one or more previously existing versions of a software and keep the previously existing version(s) available until the reference count indicates that there are no longer any existing user sessions using the previously existing version(s). In some embodiments, two or more separate user sessions can be using two or more different versions of a software at the same time. This allows users to have a consistent user experience (e.g., look and feel of the application) throughout the entire user session.

Some embodiments provide methods, systems, and computer readable medium for ensuring that there is not a service loss for existing users using a previous version of a software. In certain embodiments, a first version of a plugin package can be uploaded to a shared plugin registry, where the first version of the plugin package has one or more components. A second version of the plugin package can also be uploaded to the shared plugin registry, where the second version of the plugin package has been deployed to replace the first version of the plugin package. Some embodiments can determine a reference count associated with the first version of the plugin package. The reference count can be indicative of whether there are one or more active user sessions associated with the first version of the plugin package. Certain embodiments can maintain the first version of the plugin package and the second version of the plugin package in the shared plugin registry when the reference count associated with the first version of the plugin package is not zero.

Certain embodiments can receive an indication that a user session has started after the first version of the plugin package has been uploaded to the shared plugin registry. Some embodiments increase the reference count associated with the first version of the plugin package upon receiving the indication that the user session has started. In some embodiments, the first version of the plugin package is continued to be made available to the user session after the second version of the plugin package is uploaded. Further, some embodiments can receive an indication that another user session has started after the second version of the plugin package has been uploaded to the shared plugin registry. Certain embodiments then provide the second version of the plugin package to the other user session. In some embodiments, the first version of the plugin package is used in the user session concurrently as the second version of the plugin package in the other user session. Further, some embodiments can also decrement the reference count associated with the first version of the plugin package when the user session ends.

In some embodiments, the second version of the plugin package can include a same component from the first version of the plugin package where the same component has the same version number. In certain embodiments, the first version of the plugin package can include a first version of a component and the second version of the plugin package can include a second version of the component. Some embodiments may, when the reference count associated with the first version of the plugin package is zero, determine whether the first version of the plugin package is the latest version of the plugin package and mark the first version of the plugin package for removal from the shared plugin registry if the first version of the plugin package is not the latest version of the plugin package.

Further, some embodiments may receive an indication that a new user session has started after the second version of the plugin package has been uploaded to the shared plugin registry. Certain embodiments may enable use of the second version of the plugin package during the new user session instead of the first version. Some embodiments may increase a reference count for the second version of the plugin package. Certain embodiments keep track of the reference count for each version of the plugin package to determine whether the plugin package should be removed. When a reference count for a version of a plugin package indicates that the plugin package is no longer being used by any user sessions and when there is a newer version of the plugin package uploaded and available to future user sessions, then the plugin service may remove the version of the plugin package or mark the version of the plugin package for deletion.

Some embodiments can store information identifying one or more plugin packages used during the new user session. In some embodiments, one or more timestamps associated with the one or more plugin packages may also be stored. Each timestamp can identify a time at which each of the plugin packages was provided for the new user session. Some embodiments can enable access to the same one or more plugin packages throughout a duration of the new user session regardless of one or more additional plugin packages uploaded to the shared plugin registry at a later time to the times identified by the one or more timestamps, where the one or more additional plugin packages can include one or more newer versions of the one or more plugin packages. Further, some embodiments may automatically remove the first version of the package when the reference count associated with the first version of the package goes down to zero.

Furthermore, some embodiments may, on startup, load metadata for latest version of each plugin into memory and store the metadata in an in-memory plugin registry. Certain embodiments may, on user login, add a reference to current registry to user session and increment reference count for each plugin version in registry. Some embodiments may constantly or periodically scan the plugin store, e.g., by polling or by notification, depending on plugin manager implementation, whether the plugins are filed based or web cat based, etc. When a new plugin is detected, some embodiments may load the metadata into memory. When a plugin uploader is uploading a set of new plugins, a plugin manager of some embodiments may process all plugins in the set as an atomic operation. Some embodiments may create a new registry version with latest version of all the plugins. In some embodiments, previous versions of any plugin that had a new version detected in this round may be kept around if reference count is not zero (but marked as eligible for removal from memory). Certain embodiments, on user logout, can decrement a reference count for each plugin version. Any plugin that is marked from removal from memory and also has a reference count of zero can be removed from memory. If cleanup flag is set, some embodiments may also delete the plugin from underlying store. During any point of a user's session, embodiments may enable the same versions of same plugins in the registry to be available and accessible to the user session. Any plugin version that is being used by the user session may not be deleted while the session remains active.

DETAILED DESCRIPTION

Figure 1:
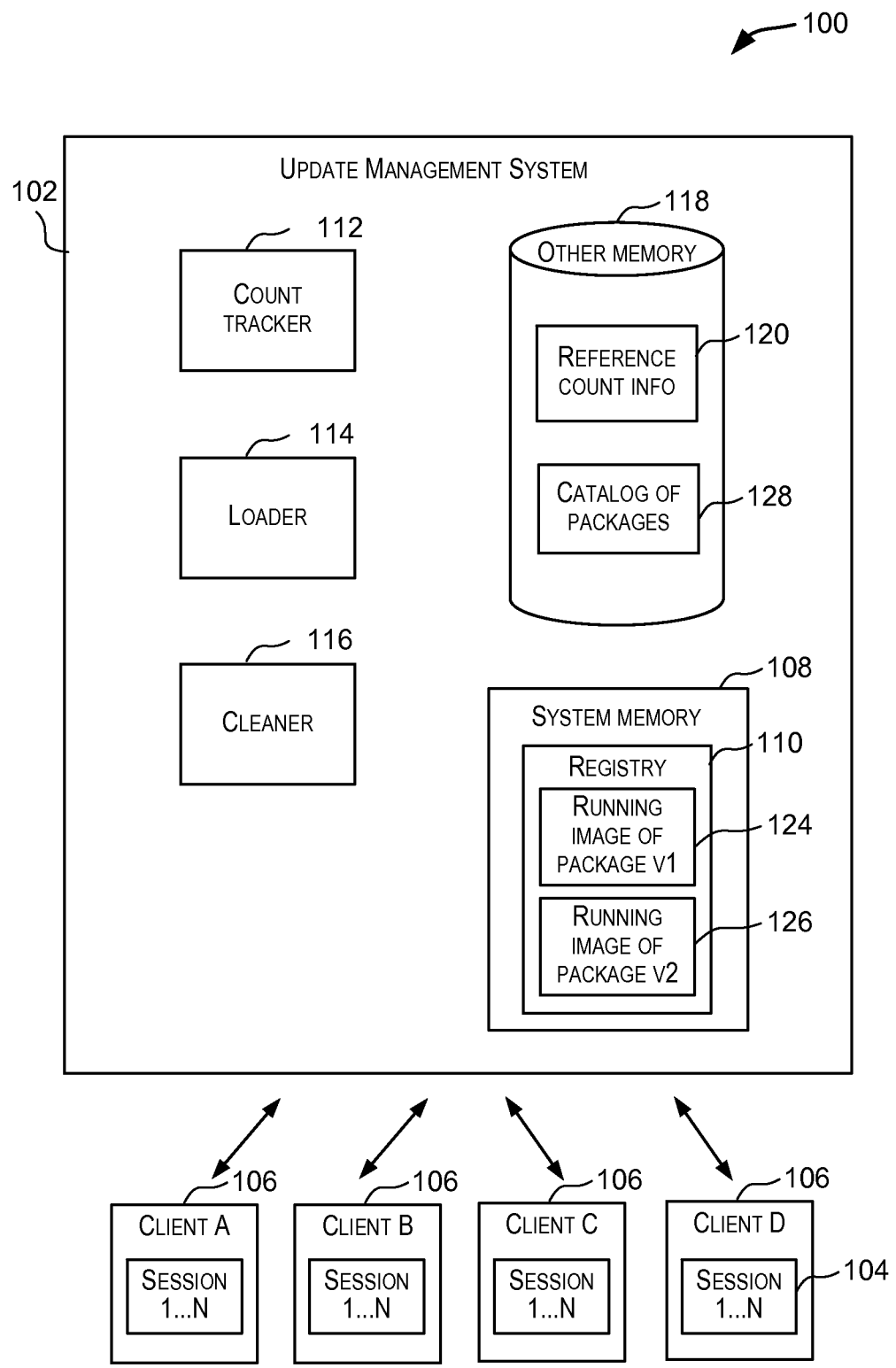
FIG. 1 illustrates an example block diagram of a computing environment in accordance with some embodiments of the present invention.

Some embodiments of the present invention can enable the uploading of new plugin packages (e.g., an updated version of a plugin package) to a plugin service without affecting an existing user session that is using an older version of the plugin package (also referred to as software package throughout this disclosure).

Embodiments can continue to allow users sessions to use an old software package even while the software is being upgraded to a newer version of the software package. Some embodiments enable both the old package and the newer version of the software package to be available to user sessions simultaneously to ensure consistency for those user sessions that were already using the old package when the newer version was being uploaded. New user sessions that begin after the newer version of the software package has been uploaded can then use the newer version. Meanwhile, the user sessions that were already using the old package may continue to use the old package while the new user sessions are using the newer version of the software package.

Embodiments allow different user sessions to use different versions of a same package concurrently. Conventionally, when a software is being upgraded, there could not have been an old version and a new version of the same software co-existing across one or more computing devices. If an upgraded needed to be performed, typically a maintenance window is created where users are warned to close their applications during the time period of the maintenance window. During the maintenance window, no user sessions are permitted to run and all the applications are shut down. The upgrade is performed during the maintenance window where the new version of the software is uploaded and the old version of the software is removed. Only the new version of the software is then available to users after the maintenance window is over. If there were existing user sessions using the older version of the software, then these user sessions are forced to switch to the newer version where there may be many changes made.

In some instances, even if a user session is using the older version of the software, the software may be closed automatically and the user session may come to a halt. In certain instances, the user may still see an image of the software on the screen while the software is no longer usable or functioning properly (e.g., hangs when you click on it). It is undesirable to force the users to switch to a new version suddenly where various updated elements may be inconsistent with the previous version.

Certain embodiments allow upgrades to occur even while a user session using an older version of software is ongoing at the same time. In some embodiments, so long as a reference count associated with a software version is not zero, the user session may continue to use the software version and may also use an updated version if desired.

Embodiments permit an upgrade without having to keep track of which user sessions are still currently using an older version of a software or which user sessions have begun using the newer version of the software.

In some embodiments, when a new user session begins, the plugin service can determine a set of plugin packages requested by the new user session and take a snapshot of the set of plugin packages. A reference count associated with each of the plugin packages can be increased. Before the end of the active user session, the plugin service continues to make the set of plugin packages available to the user regardless of newer versions of plugin packages being uploaded to the plugin service. The plugin service tracks the reference counts associated with each plugin package where the reference count may indicate a number of active user sessions that could be utilizing the plugin package. The plugin service can remove the older versions of the plugin package when it determines that there are no longer any active user sessions utilizing the plugin package.

The middleware architecture provides a plugin registry service (also referred to as plugin service) for managing plugin bundles/packages. In some embodiments, the plugin registry service ensures that all the plugin packages and their associated components that were available to the user since the beginning of the user session remains available to the user throughout the session. In certain embodiments, since 1) the plugin registry service may not be aware of which plugin packages the user uses during the session and 2) newly uploaded components or plugin packages may not be compatible with other components that the user is currently using, the plugin registry service can take a snapshot of all the plugin packages available in the plugin registry at the beginning of the user session. While the user session is active, the plugin registry service prevents the removal or replacement of those plugin packages regardless of updates of the plugin packages being uploaded to the plugin registry. The plugin registry service can keep track of the plugin packages that could potentially be used by active user sessions and maintain the availability of those plugin packages.

In some embodiments, the plugin service can have multiple versions of a plugin bundle/package uploaded to the plugin registry. For instance, the plugin registry may have two different bar chart versions where one includes an enhancement over the other (e.g., improved color scheme). Each plugin package may include multiple components (also referred to as software modules, e.g., XML modules) where each component may have an associated version number. As components are modified and upgraded and as plugin packages bundling different components are updated, the plugin service may remove the outdated components and packages when it would not affect an existing user session.

By tracking all the plugin packages that are available to a user when a user session begins, the plugin service would minimize any disruptions to the active user session. Although newer versions of the plugin packages or components may be uploaded while the user is in the active user session, the plugin service keeps the tracked plugin packages available to the user until the user session has ended.

For purposes of this disclosure, plugin packages may be utilized in a visual analyzer system where each plugin package may include multiple components such as a bar chart component, a pie chart component, a data elements pane component, etc. A visual analyzer system can present one or more visualizations to a user through a visual analyzer application presented by a web browser (e.g., on a mobile device). In certain embodiments, a visualization is a visual representation of some data. In one embodiment, a visualization can display graphic elements, shapes and/or text. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc. The visual analyzer system may generate a visualization with multiple graphical attributes (also referred to as edges) that each correspond to a specified dimension. For example, a visual analyzer application can generate a bar chart with color, axis, size attributes that each corresponds to a dimension specified by a user such as time, sales, and entities. Each dimension may also have one or more dimension members, such as years 2009, 2010, 2011, company names X, Y, Z, and different types of products, etc.

Each visualization can include values for multiple dimensions of data from one or more columns in a database in some embodiments. A database can be a relational database that includes one or more tables. A table can have a set of rows and a set of columns. A dimension can correspond to a column of a table (or a database) while a record can correspond to a row of a table (or a database). In some embodiments, the visual analyzer application user interface (e.g., displayed through a web browser) can provide a projection of one or more databases. The user can identify one or more dimensions of data available in the one or more databases and request the visual analyzer application to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include row (also referred to as x-axis), column (also referred to as y-axis), category, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization.

The visual analyzer system can generate one or more visualizations based on one or more dimensions of data specified by a user. For example, the user may specify multiple dimensions such as time, sales, and entities to be represented by a visualization. The visual analyzer system may then generate a visualization with multiple edges (also referred to as graphical attributes) that each correspond to a specified dimension. For example, a visual analyzer application can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

I. Example Computing Environment

FIG. 1 illustrates an example block diagram of a computing environment 100 in accordance with some embodiments of the present invention. In some embodiments, computing environment 100 can include an update management system 102 and one or more client devices 106 that can each have one or more active user sessions 104. Update management system 102 in some embodiments can include a system memory 108, a count tracker 112, a loader 114, a cleaner 116, and other memory 118. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices 106 than those shown in FIG. 1.

In some embodiments, system memory 108 can include a registry 110 storing one or more running images of plugin packages. System memory 108 can be located across one or more servers or can be part of one or more client devices 106. In certain embodiments, registry 110 may include multiple versions of the same software that are active and being used by multiple user sessions simultaneously. In some embodiments, other memory 118 can include reference count information 120 and a web catalog 126. Reference count information 120 can keep track of the number of active user sessions using a particular package. In some embodiments, reference count information 120 can include a reference count for each package and can include an indication on whether the package is an old package or a current up-to-date package (i.e., the newest version of the package). In certain embodiments, reference count information 120 may also identify the client devices and/or user sessions that are using which package versions.

In some embodiments, web catalog 126 (also referred to as server catalog or catalog) can store one or more software packages (e.g., plugin packages) with one or more versions such as package A v1 and package A v2 (not shown). In some embodiments, other memory 118 can also include configuration information (not shown here) that indicates a change between two or more versions of a package (i.e., same software name/identifier but with a different version). The change can be a change in components or that a configuration of a component has changed.

Update management system 102 can upload one or more plugin packages to plugin catalog 116, which may reside in other memory 118 such as hard disk memory accessible by one or more servers. Catalog 116 may store one or more versions of different plugin packages that may be made available to user sessions. An example of a plugin package may be a bar chart plugin package, a pie chart plugin package, a report plugin package, a scatterplot plugin package, or a data query engine plugin package, etc. In certain embodiments, each plugin package may be associated with a version number. In some embodiments, each plugin package may have one or more components that are each associated with a version number. For example, a report plugin package may include multiple components that may be associated with different versions in a version of the data engine plugin package. Each of the resources within the plugin package may be a component. An example of a component in the report plugin package may be the report XML manager.

One or more client devices 106 may interact with update management system 102 and request to use one or more uploaded plugin packages that can be provided by update management system 102. One or more client devices 106 or other systems (not shown here) can each have one or more active user sessions 104 that have one or more processes requesting the different plugin packages to be used during the active user sessions. When a session is started (e.g., via a user request), a session request comes from a client device 106. In certain embodiments, one or more processes that are part of the user session may use one or more plugin packages accessible via registry 110 in update management system 102. In some embodiments, a running image of the different plugin packages 124 and 126 to be used during the active user sessions may be created in registry 110 that resides in system memory 108 (e.g., RAM). System memory 108 can reside on one or more servers or on one or more client devices. As shown, in certain embodiments, two different images of different versions of a software can be sitting in memory 108 at the same time.

In some embodiments, update management system 102 (e.g., count tracker 112 in update management system 102) can take a snapshot of each of the plugin packages requested by or provided to a client device 106 for a user session during the user session. As each plugin package can include one or more components with corresponding specific version numbers, some embodiments store a snapshot image of each of these plugin packages in running memory (e.g., system memory 108) to keep track of the components with their corresponding versions. Embodiments may ensure that each of the components of those corresponding version numbers is kept active.

In some embodiments, count tracker 112 (also referred to as reference count updater) can keep track of how many active sessions are still ongoing for a plugin package. In certain embodiments, count tracker 112 can monitor, for each plugin package, one or more active user sessions that are using the plugin packages (e.g., packages 124 and 126) and keep a reference count 120 that corresponds to the number of active user sessions (e.g., across one or more client devices 106) using the plugin package. One of ordinary skill in the art understands that an active user session can be the duration between when a user logs in and logs off or when there is a time out e.g., from idling. In some embodiments, multiple active user sessions can be initiated from the same or different client devices. Count tracker 112 tracks and stores the reference count 120 for each plugin package (e.g., in a table) in other memory 118 (e.g., hard disk memory).

In some embodiments, upon receiving a request from a user to start a new user session, update management system 102 can take a snapshot of all available plugin packages in catalog 128. In some embodiments, count tracker 112 (also referred to as reference count updater) can identify all of the available plugin packages and their versions when the active user session begins. Some embodiments store a timestamp of when the active user session begins along with information on the available plugin packages at the time. As such, update management system 102 can keep track of the available plugin packages at a particular time indicated by the timestamp and ensure that the same plugin packages remain available and unmodified throughout the active user session.

In certain embodiments, count tracker 112 can determine which plugin packages are available in catalog 128 and update a reference count associated with each version of a plugin package. For example, if plugin package A version 1 is available and plugin package A version 2 is available, then a reference count associated with plugin package A version 1 is increased and plugin package A version 2 is also increased. As another user session becomes active, count tracker 112 determines again which plugin packages are available in catalog 128 at that time and further increases the reference count associated with each version of an available plugin package.

Count tracker 112 updates the reference count for each plugin package and its associated version number as new user sessions become active and inactive. While in this example, the reference count is kept for each plugin package and its associated version number, different embodiments may associate a reference count with different units in the system. For example, some embodiments may associate a reference count with each component within a plugin package while some embodiments may associate a reference count with each plugin package regardless of the version number of the plugin package. Some embodiments may also associate a reference count with each version of each component within a plugin package.

Different plugin packages are continually being updated by a system administrator or a user of update management system 102. A system administrator may upload a newer, updated version of a plugin package to catalog 128. Sometimes, older versions of a plugin package may be kept in catalog 128 or re-uploaded to catalog 128, for example, when one discovers that the older version is more reliable and stable than the newer version. Different versions of a plugin package may be uploaded to the system or maintained on the system at the same time and made available to user session.

When another version of a plugin package is uploaded to catalog 128, some embodiments may remove the older version of the plugin package and allow an active user session to use the newly uploaded plugin package during the same session. Some embodiments may not remove the older version of the plugin package until the system verifies that the older version of the plugin package is no longer being used in any active user sessions. In some embodiments, upon receiving an indication that an updated plugin package with another version number has been uploaded to catalog 128, loader 114 can determine whether a reference count for the older version (or previously available version) of the plugin package is not zero. If loader 114 determines that the reference count for the older version (or previously available version) of the plugin package is not zero, then catalog 128 may maintain both versions of the plugin package. Both versions of the plugin package may be made available to future user sessions. Some embodiments automatically select the most recently uploaded plugin package or the plugin package with the latest version number to make available to a new user session.

In some embodiments, loader 114 may determine what new package needs to be uploaded by looking at configuration information associated with the packages. The configuration information can identify the components and their associated versions that make up each package. Loader 114 may determine the variation between packages based on configuration information associated with the packages. Upon receiving a signal to load a new package, loader 114 can determine that the new package is an updated version of a previously existing package based on configuration information associated with the packages. In some embodiments, loader 114 can determine that the package is a newer version of a package that is to replace the existing package.

If loader 114 determines that the reference count for the older version (or previously available version) of the plugin package is zero, cleaner 116 may determine whether to remove the older or previously available version from catalog 128. The previously available version can be an older version than the version of the software that is uploaded at a later time in some instances. In some embodiments, cleaner 116 may automatically remove the previously available version upon determining that the reference count for the previously available version is zero. In certain embodiments, upon determining that the reference count for the previously available version is zero, cleaner 116 may determine whether there is a newer version of the software package that is available. Cleaner 116 may only automatically remove the older version of the software if there is a newer version of the software available in addition to there being no active user sessions using the older version of the software. In certain embodiments, cleaner 116 can determine whether there are any active user sessions using a software package and whether the package is an updated package based on reference count information 120 associated with the package. As described, the reference count information can include a reference count associated with the package indicating a number of active user sessions using the package and an indication as to whether the package is a current package or an older version of the package. In some embodiments, cleaner 116 can mark the particular version of the plugin package for later removal or for removal pending approval from a system administrator. Update management system 102 can make the newly uploaded version of the plugin package available to future new user sessions.

Update management system 102 can provide plugin packages/bundles to multiple users and receive updated plugin packages without affecting existing user sessions. As described, update management system 102 can track a reference count associated with each version of a plugin package. The reference count can identify a number of active user sessions that may potentially be using those versions of plugin packages. By tracking reference counts associated with plugin packages that are available, update management system 102 can ensure that the same versions of plugin packages made available to the user session from the beginning of the user session remains available to the user throughout the entire active user session. Based on the reference counts associated with the plugin packages, update management system 102 can determine when to replace one version of a plugin package with another version of the plugin package.

II. Process Overview

Figure 2:
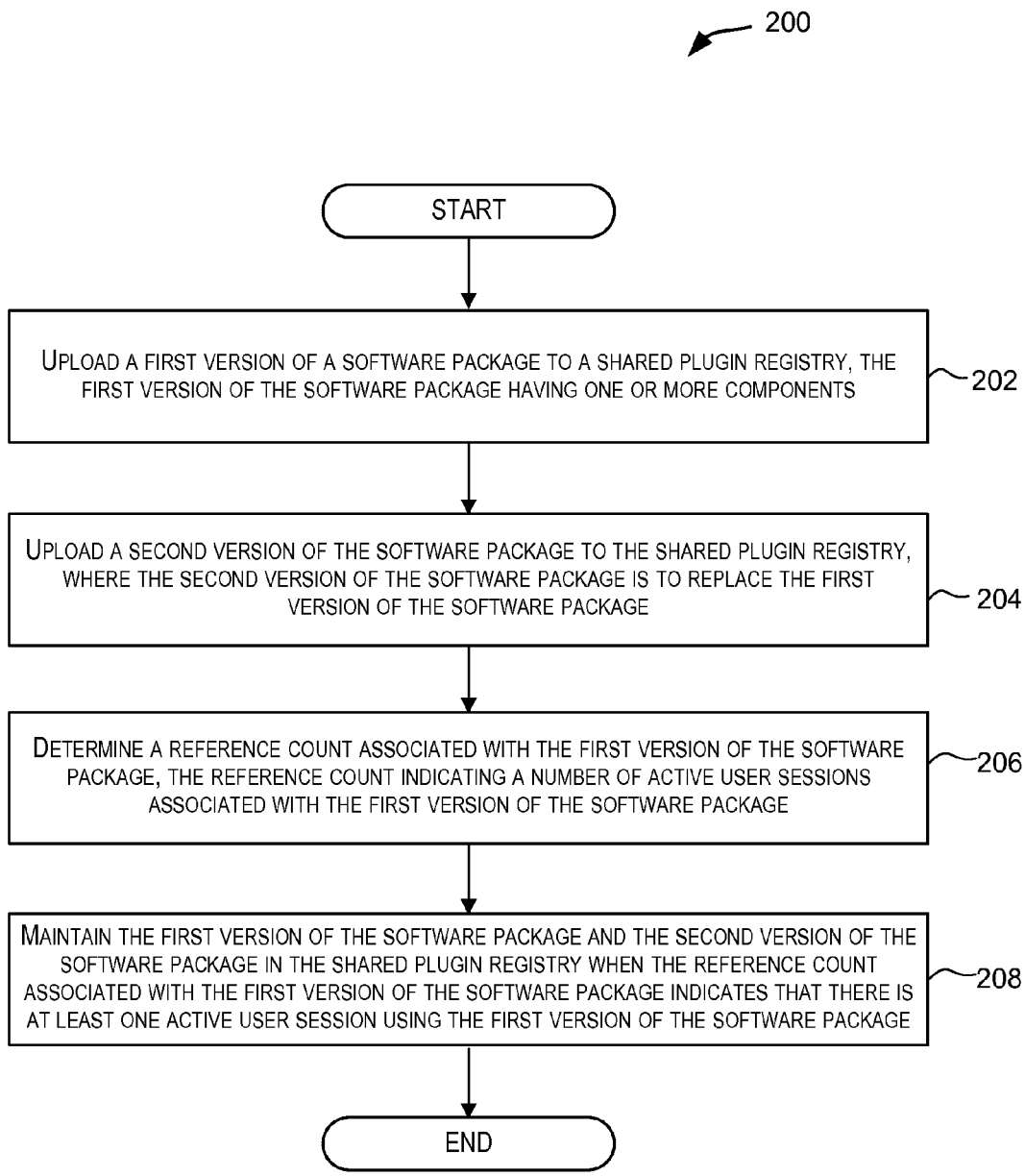
FIG. 2 illustrates an example process of enabling live updating and downgrading of plugin packages without affecting existing user sessions in accordance with some embodiments of the present invention.

FIG. 2 illustrates an example process 200 of enabling live updating and downgrading of plugin packages without affecting existing user sessions in accordance with some embodiments of the present invention. The process depicted in FIG. 2 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 2 is not intended to be limiting. In certain embodiments, the processing depicted in FIG. 2 is performed by computing system 100 depicted in FIG. 1.

At block 202, process 200 can upload a first version of a software package to a shared plugin registry. The first version of the software package can have one or more components (also referred to as software modules). In some embodiments, the shared plugin registry can be a catalog similar to catalog 128 in FIG. 1. The shared plugin registry can reside on hardware memory coupled to one or more servers. The software package can have one or more components that each have an associated version number associated with it, such as C1v2, C2v3, etc. Once a software package is uploaded to the shared plugin registry residing on hardware memory of one or more servers, a copy of the software package (or a running image of the software package) may be created in a cache or system memory (e.g., system memory 108 from FIG. 1) of one or more client devices to be used during a user session.

At block 204, process 200 can upload a second version of the software package to the shared plugin registry, where the second version of the software package is to replace the first version of the software package. In some embodiments, a visual analyzer component in a package can be a bar chart. In some embodiments, the second version of the software package can have multiple components where one or more components have a different version compared to the components in the first version of the software package. For example, second version of software package can include bar chart component v2, scatterplot component v3, etc. In certain embodiments, second version of the software package can be an upgrade of the software compared to the first version of the software package. For example, a first visual analyzer component in a first package can include bar chart v1 and a second visual analyzer component in a second package (updated version of the same package) can include bar chart v2 where bar chart v2 has an improved color scheme enhancement and where bar chart v2 is to replace bar chart v1.

At block 206, process 200 can determine a reference count associated with the first version of the software package. The reference count can indicate a number of active user sessions associated with the first version of the software package. In some embodiments, when a software package is requested by a user session, a reference count associated with a version of the software package is incremented by a plugin service, such as a count tracker 112 in update management system 102 in FIG. 1. The reference count associated with a version of the software package may also be decremented when a user session ends. Each software package in a server catalog (e.g., catalog 128 in FIG. 1) may have a reference count associated with it that indicates the number of active user sessions using that software package. The server catalog may include multiple software packages (e.g., P1, P2, P3, etc.) where some of the packages have multiple versions concurrently residing on the server catalog (e.g., P1v1, P1v2, P1v3, P2v1, P3v3, P3v4, etc.). The packages that are currently being used in an active user session may have a running image of the package generated and residing in a registry such as registry 110 in system memory 108 of FIG. 1. In some embodiments, the running image of the different plugin packages 124 and 126 can be created in a registry that is part of memory residing on a client device. For example, multiple versions of the same package (i.e., package name or package identifier e.g., Outlook® or Word®) can be running on a user device's browser memory.

At block 208, process 200 can maintain the first version of the software package and the second version of the software package in the shared plugin registry when the reference count associated with the first version of the software package indicates that there is at least one active user session using the first version of the software package. In some embodiments, when there are no active user sessions using a software package, the reference count can be zero. If the reference count is more than zero, then there may be at least one or more active user sessions using that version of the software package. Some embodiments may remove a software package when the reference count associated with the package is zero. Certain embodiments may mark a software package for deletion when the reference count is zero and when there is an updated version of the software package uploaded where the updated version is to replace the previous version of the package. However, even when there is an updated version of the package uploaded to the plugin registry service, some embodiments may not remove (or mark for deletion) the previous version of the package if there are still active user sessions using the previous version of the package. Embodiments may maintain both versions of the package on server catalog 128 such that the different versions of the package may be requested to be used in one or more user sessions.

Some embodiments support multiple simultaneous users for different version of the software where the multiple versions of the software are currently in use by different user sessions. While a first user session is using a first version of a software package, a second user session may be using a second version of the software package simultaneously. In some embodiments, the second user session may not have started until after the second version of the software package had been uploaded to the server catalog. Some embodiments therefore provide the second (i.e., updated) version of the software package to the second user session. In the meantime, first user session may continue to use the first version of the software package. Embodiments ensure consistency for the first user session by keeping the first version of the software package on server catalog and continuing to make the version accessible regardless of the second version of the software package being uploaded to the server catalog. As such, an upgrade can be performed without warning users using an older version of the package or without interrupting the user sessions that were using the older version of the package.

III. Example Function of a Count Tracking Engine

Figure 3:
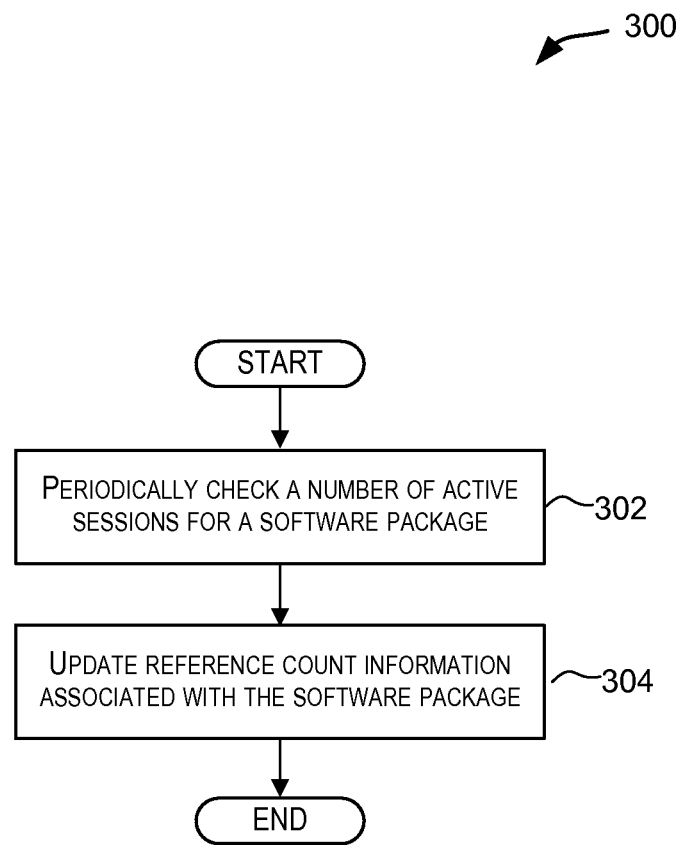
FIG. 3 illustrates an example process of monitoring, for a package, one or more active user sessions using the package and keeping a reference count that corresponds to the number of active user sessions using the plugin package in accordance with some embodiments of the present invention.

FIG. 3 illustrates an example process 300 of monitoring, for a package, one or more active user sessions using the package and keeping a reference count that corresponds to the number of active user sessions using the plugin package in accordance with some embodiments of the present invention. The processes depicted in FIGS. 3-6 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIGS. 3-6 is not intended to be limiting. In certain embodiments, the processing depicted in FIGS. 3-6 is performed by one or more modules part of update management system 100 depicted in FIG. 1.

At block 302, process 300 can periodically check a number of active sessions for a software package. In some embodiments, a monitoring module such as count tracker 112 in FIG. 1 can continuously monitor the number of active user sessions for a package by determining whether there are new user sessions that request the package or whether user sessions that were using the package have ended. Some embodiments may constantly scan (e.g., by polling, by notification, depending on plugin manager implementation), a plugin store . . . . In some embodiments, a count tracker may check the number of active sessions for a package periodically and possibly more frequently when a newer version has been loaded.

At block 304, process 300 can update reference count information associated with the software package. In some embodiments, reference count information can include a reference count that indicates a number of active user sessions using a particular package. Certain embodiments may increment a reference count associated with a package when a new user session requests to use the package. Some embodiments may decrement the reference count associated with the package when a user session that was using the package has ended. As count tracker monitors the active sessions associated with a package, count tracker can write the reference count associated with the package to a data structure (e.g., a table) that stores reference count information (e.g., reference count information 120 from FIG. 1). In some embodiments, the plugin service may also remove the running image of a package on system memory (e.g., residing on a client device) when the user session ends.

IV. Example Function of a Loader Engine

Figure 4:
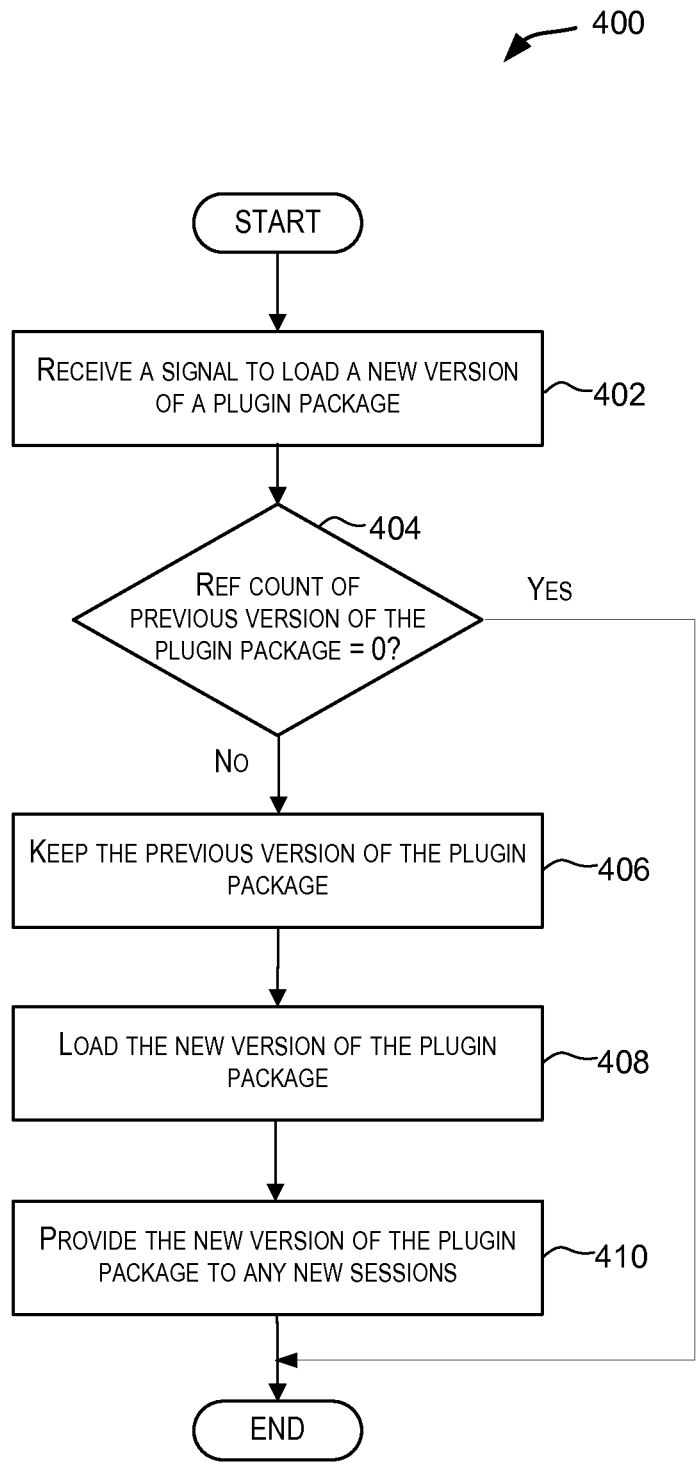
FIG. 4 illustrates an example process of loading a new version of a package while keeping the older version of the package loaded to ensure consistency for user sessions using the old package in accordance with certain embodiments of the invention.

FIG. 4 illustrates an example process 400 of loading a new version of a package while keeping the older version of the package loaded to ensure consistency for user sessions using the old package in accordance with certain embodiments of the invention. In some embodiments, a system administrator may desire to load a newer version of a package to a server catalog to enable user sessions to use the newer version of the package. The newer version of the package can include one or more components similar to the ones in the older version of the package but where the one or more components have been updated to a newer version. In some embodiments, the newer version of the package is for replacing the older version of the package, as the newer version may have additional (or fewer in some instances) components and/or more updated features for a component compared to the older version of the package. Upon loading the newer version of the package, new session requests may be directed to the new package.

At block 402, process 400 can receive a signal to load a new version of a package. In some embodiments, a loader such as loader 114 in FIG. 1 can upload a new version of a package into a server catalog such as catalog 128 in FIG. 1. The signal to load the new version of the package can be received when a system administrator or a user has indicated to upload the new version of the package to memory (e.g., other memory 118 from FIG. 1). The new version of the package can be a replacement of an older or previous version of the package. In some embodiments, in response to receiving the signal to load the new version, a loader can update a data structure (e.g., a count table) that stores reference count information (e.g., reference count information 120 from FIG. 1) with an indication as to whether a package is an old package (i.e., an older version of the package).

At block 404, process 400 can determine whether a reference count of a previous version of the package is equal to zero. Some embodiments may determine a reference count associated with a package in response to receiving the signal to load the new version of the package. In some embodiments, the reference count indicates a number of users having an active session with respect to a package. In certain embodiments, a loader engine may obtain the reference count information from a count tracker (e.g., count tracker from FIG. 1).

At block 406, process 400 can keep the previous version of the package when the reference count of the previous version of the package is determined not to be zero. Some embodiments may mark the package as an older version of the package if the reference count is determined not to be zero.

At block 408, process 400 can load the new version of the package. In some embodiments, the new version of the package can be loaded to a server catalog (e.g., catalog 128 from FIG. 1). As such, when loading a new package, if the count for the old package has not gone down to zero then the old package can also be kept so that the users who are already using the old package can continue to use the old package even though the new package has been loaded. Some embodiments enable the new version of the package to be loaded but at the same time enable the previous version of the package to be used by its existing users. Although the new version of the package is intended to supersede or replace the previous version of the package, the previous version is also kept active while its count is not zero so that anyone who is still using the previous version can continue to do so.

At block 410, process 400 can provide the new version of the package to a new user session that starts after the new version of the package has been loaded to server catalog. In some embodiments the new version of the package can be loaded into system memory. For example, a running image of the package can be loaded into registry 110 in system memory 108 from FIG. 1. While the server may have a copy of all the available packages, system memory 108 residing on each local client device may have a running image of package(s) that are used for each user session. Once the new version of the package has been loaded, newly started user sessions (i.e., user sessions initiated after the new version of the package has been loaded) may be provided the new version of the package (e.g., when the user requests the software, regardless of whether the user specifies a version of the software). In the meantime, user sessions that were already using the older version of the package may continue to use the older version.

V. Example Function of a Cleaner Engine

Figure 5:
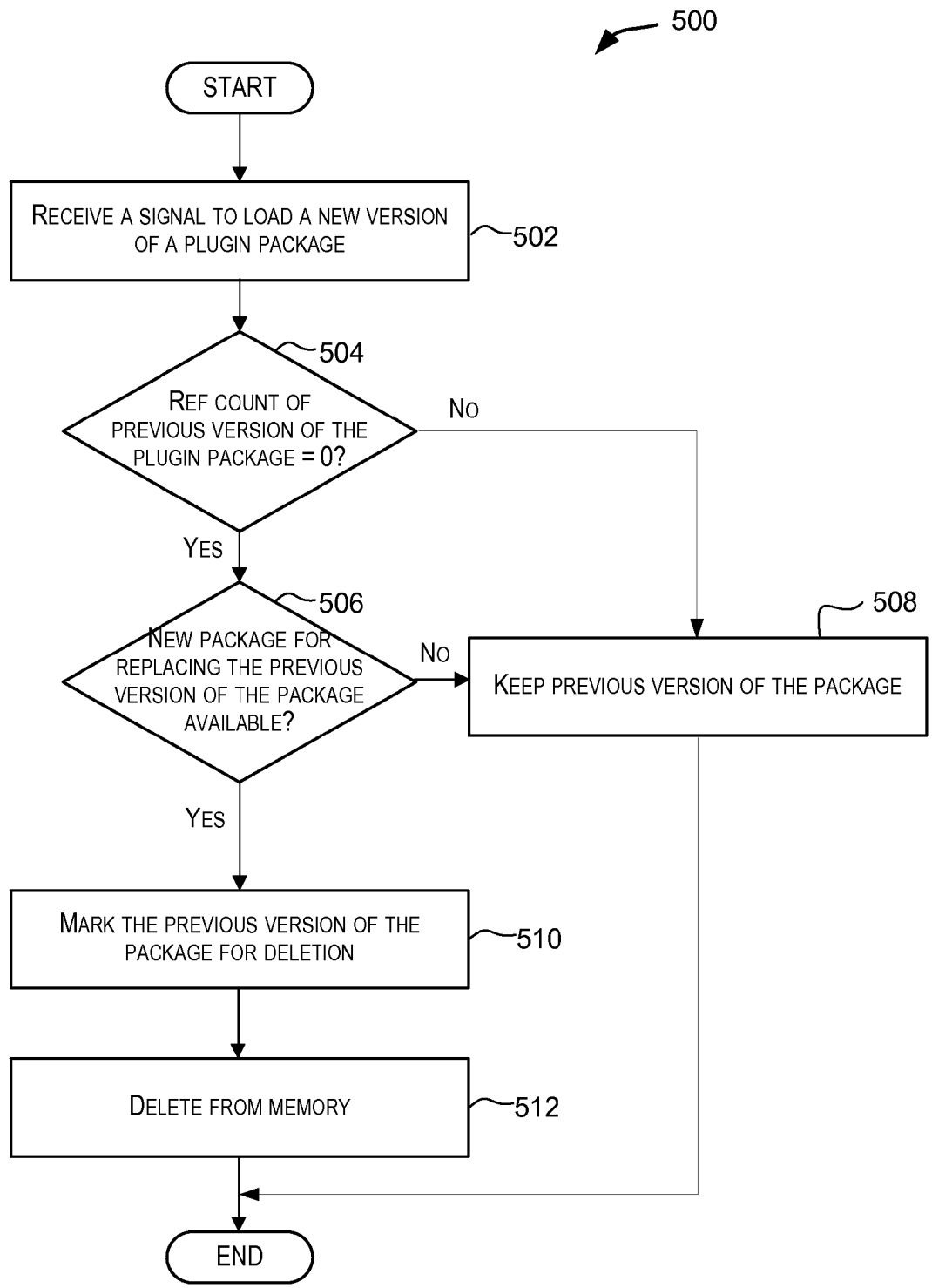
FIG. 5 illustrates an example process of removing an older version of a package in accordance with certain embodiments of the invention.

FIG. 5 illustrates an example process 500 of removing an older version of a package in accordance with certain embodiments of the invention. In some embodiments, a cleaner such as cleaner 116 in FIG. 1 can determine whether to remove a package. Upon loading a newer version of a package to a server catalog that is for replacing an older version of the package, some embodiments may determine whether to remove the older version of the package.

At block 502, process 500 can receive a signal to load a new version of a package. In some embodiments, a system administrator or user may upload a new version of a software package as an upgrade to an existing version of the package.

At block 504, process 500 can determine whether a reference count of a previous version of the package is zero. Some embodiments may determine a reference count of the previous version of the package in response to receiving the signal to load the new version of the package. In some embodiments, count tracker may keep track of the reference count associated with the old package and cleaner may obtain the reference count from count tracker.

At block 506, process 500 can determine whether a new package to replace the previous version of the package is available upon determining that the reference count of the previous version of the package is zero. In some embodiments, a cleaner module may determine from reference count information associated with a package whether the package is a superseded package.

At block 508, process 500 can keep the previous version of the package upon determining that the reference count of the previous version of the package is not zero. Further, process 500 may keep the previous version of the package alive (i.e., not remove the previous version of the package from catalog) upon determining that there is no new package to replace the previous version of the package available, even if the count for the package is zero. Some embodiments may clean up the running image of the package and relevant information from memory (e.g., system memory) of a client device when a user session using the previous version of the package ends, while keeping the package in the catalog (e.g., hard disk memory of one or more servers).

At block 510, process 500 can mark the previous version of the package for deletion. Some embodiments may determine to remove the previous version of the package when both conditions are met: 1) the count is zero and 2) there is a new package to replace the current package. In some embodiments, one or more packages are marked for deletion and the cleaner may periodically identify all the packages that have been marked for deletion and perform the cleanup.

At block 512, process 500 can delete the previous version of the package from memory. In some embodiments, the package can be removed from system memory (e.g., system memory 108 from FIG. 1) and/or from hardware disk memory (e.g., other memory 118 from FIG. 1). Some embodiments remove the package image from system memory of a server. In some embodiments, the image and/or some portion of the software may be on a client device. Some embodiments may then remove the image on the client device and any relevant files that facilitate use of the package on both the server and the client device. The relevant files of the package may be stored on either system memory or other memory including hard disk memory of the server or the client device. In some embodiments, the reference count associated with the package to be removed is also removed from the reference count information (e.g., reference count information 120 from FIG. 1).

Figure 6:
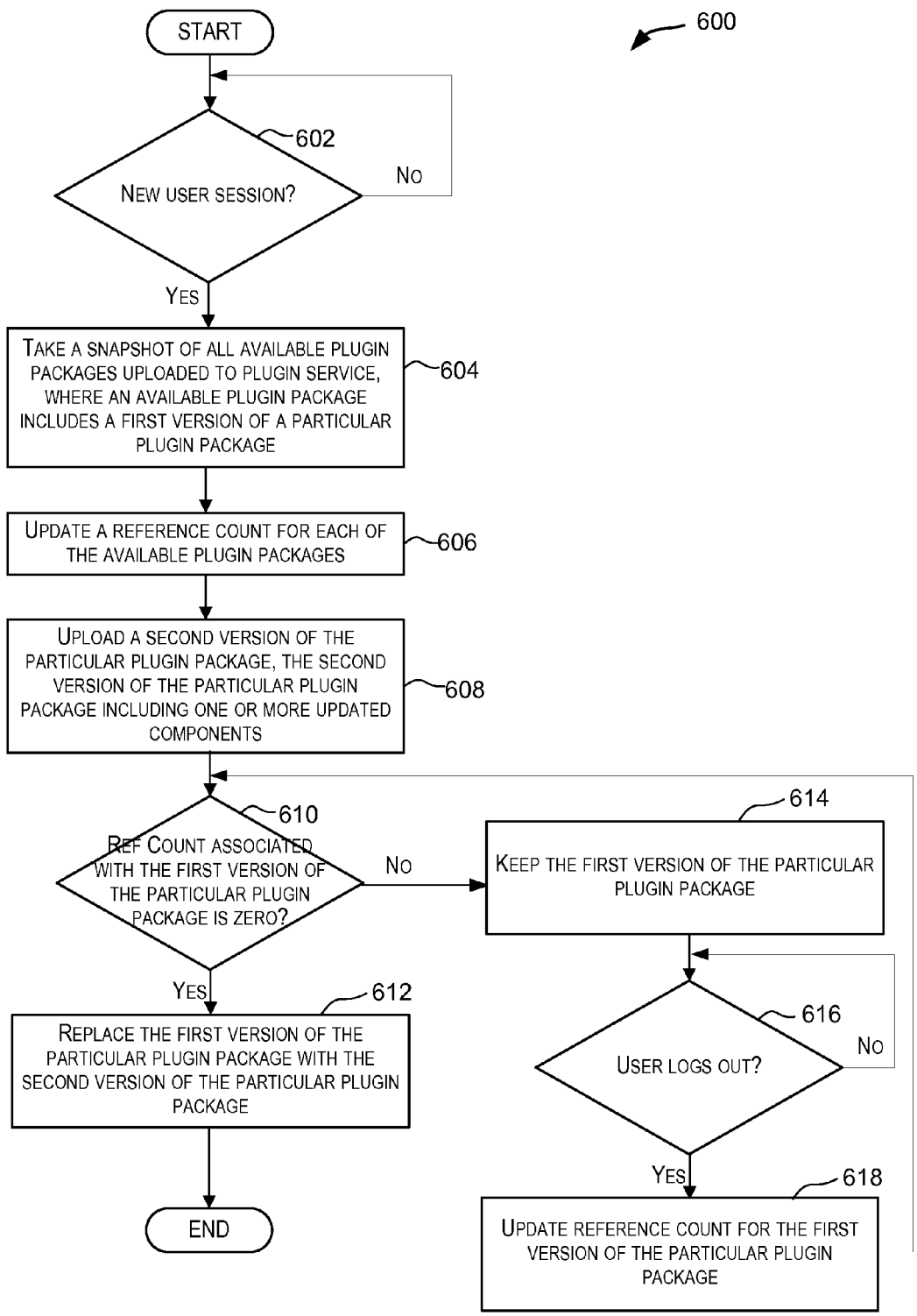
FIG. 6 illustrates an example process of enabling a user session to have access to same versions of the same plugins during any point of the user session in accordance with certain embodiments of the invention.

VI. Example Flow For Enabling a User Session to Have Access to Same Versions of Same Plugins During Any Point of the User Session FIG. 6 illustrates an example process 600 of enabling a user session to have access to same versions of the same plugins during any point of the user session in accordance with certain embodiments of the invention. Some embodiments enable a user session to have access to a same version of a software package while newer version(s) of the software package may be uploaded to a shared registry (e.g., hard disk memory in server). The newer version of the software package may have one or more components in addition to the older version of the software package or one or more components with a different version number compared to the older version of the software package. As described, a system administrator or user uploads the newer version of the software package with the intent to replace the older version of the software package at a point in time (e.g., when there are no longer any active user sessions associated with the older version of the software package). Embodiments ensure that a session has a consistent look and feel once a user starts a session. Some embodiments avoid changing or updating the backend software made available for an existing user session in the middle of the user session.

At block 602, process 600 determines whether a new user session has begun. In some embodiments, on startup, metadata for a latest version of each plugin package can be loaded into memory and stored in an in-memory plugin registry.

At block 604, upon determining that a user has logged in or started a new session, process 600 takes a snapshot of all available plugin packages uploaded to plugin service. In some embodiments, an available plugin package includes a first version of a particular plugin package. The plugin service can determine the available plugins where each plugin can have a configuration file (e.g., an XML file) that is driving the contents of the plugin. If there are multiple versions of a particular plugin available, plugin service can select the latest version of the particular plugin and allow the user to use that version of the particular plugin during the user session. Some embodiments scan the available sets of uploaded plugins and store information related to the available set of uploaded plugins. In some embodiments, a timestamp indicating a starting time of the new user session can be determined and stored along with the information indicating the set of uploaded plugins available at the start of the user session. Some embodiments may store information indicating only the plugins with the latest versions.

At block 606, process 600 updates a reference count for all the available plugin packages determined in block 604. In some embodiments, on user login, a reference to current registry is added to user session and the reference count for each plugin version in registry is bumped up by 1. The plugin service may track the reference count on the plugin packages because once a user has started using a particular package the plugin service ensures that the components and packages being used by the user is consistent. This ensures that once the user starts a user session, there is a consistent look and feel about the user session that is given to the user.

At block 608, process 600 uploads a second version of the particular plugin package where the second version of the particular plugin package includes one or more updated components. In some embodiments, the plugin store is constantly scanned, for example, by polling or by notification. The method in which the plugin store is scanned can be based on the plugin manager implementation and/or whether it is filed based or web cat based, etc. When the new plugin is detected, its metadata can be loaded into memory. When the plugin uploader is uploading a set of new plugins, plugin manager can process all plugins in the set as an atomic operation in some embodiments. A new registry version can be created with the latest version of all the plugins.

At block 610, process 600 can determine whether the reference count associated with the first version of the particular plugin package is zero. At block 612, when the reference count associated with the first version of the particular plugin package is zero, process 600 can replace the first version of the particular plugin package with the second version of the particular plugin package.

At block 614, when the reference count associated with the first version of the particular plugin package is not zero, process 600 keeps the first version of the particular plugin package in memory. Previous versions of any plugins that had a new version detected in this round are kept around if reference count is not zero. If the reference count is not zero and there is a new version of the plugin uploaded, then the older version of the plugin package may be marked as eligible for removal from memory.

At block 616, process 600 can determine whether the user has logged out. At block 618, process 600 updates reference count for the first version of the particular plugin package upon determining that the user has logged out. In some embodiments, on user logout, reference count is decremented for each plugin version. Some embodiments may identify all the packages associated with the user session (e.g., used during the user session) and decrement a reference count associated with each of those packages. Any plugin that is marked from removal from memory (e.g., having a reference count of zero) is removed from memory. If cleanup flag is set, it can also be deleted from the underlying store.

Embodiments enable management of a central server that is serving up plugin bundles to many users. Some embodiments enable live updating and downgrading of plugin packages without affecting existing user sessions. During any point of a user's session, the user may always be using the same versions of the same plugins in the registry. None of the plugin versions that are being used in the session may be deleted while the session is still active. Certain embodiments enable per user and tenant selection of what plugins to use/see.

VII. Example Distributed System

Figure 7:
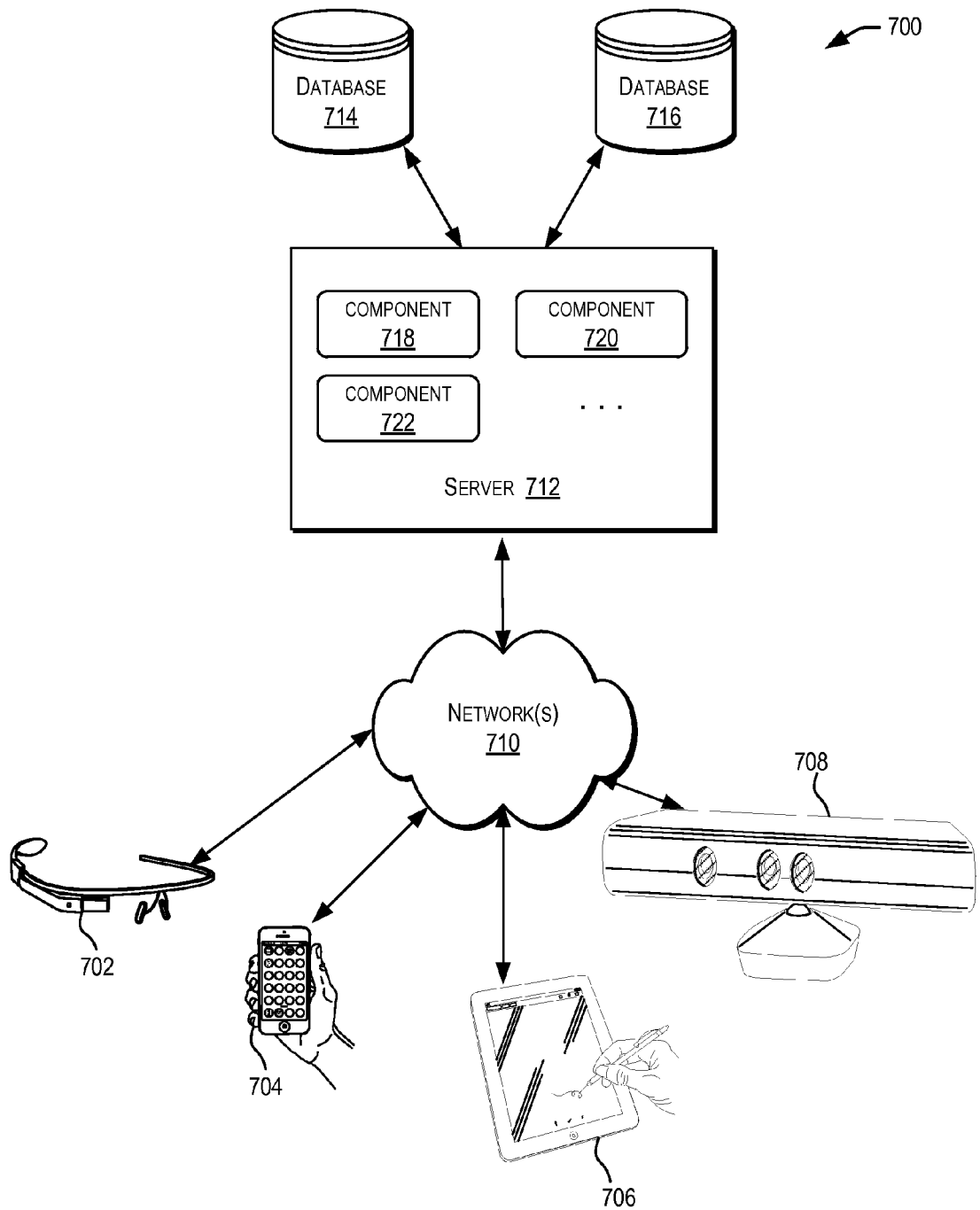
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications such as services and applications that provide the document (e.g., webpage) analysis and modification-related processing. In certain embodiments, server 712 may also provide other services or software applications that can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 710.

Although distributed system 700 in FIG. 7 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present invention. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

VIII. Example System Environment

Figure 8:
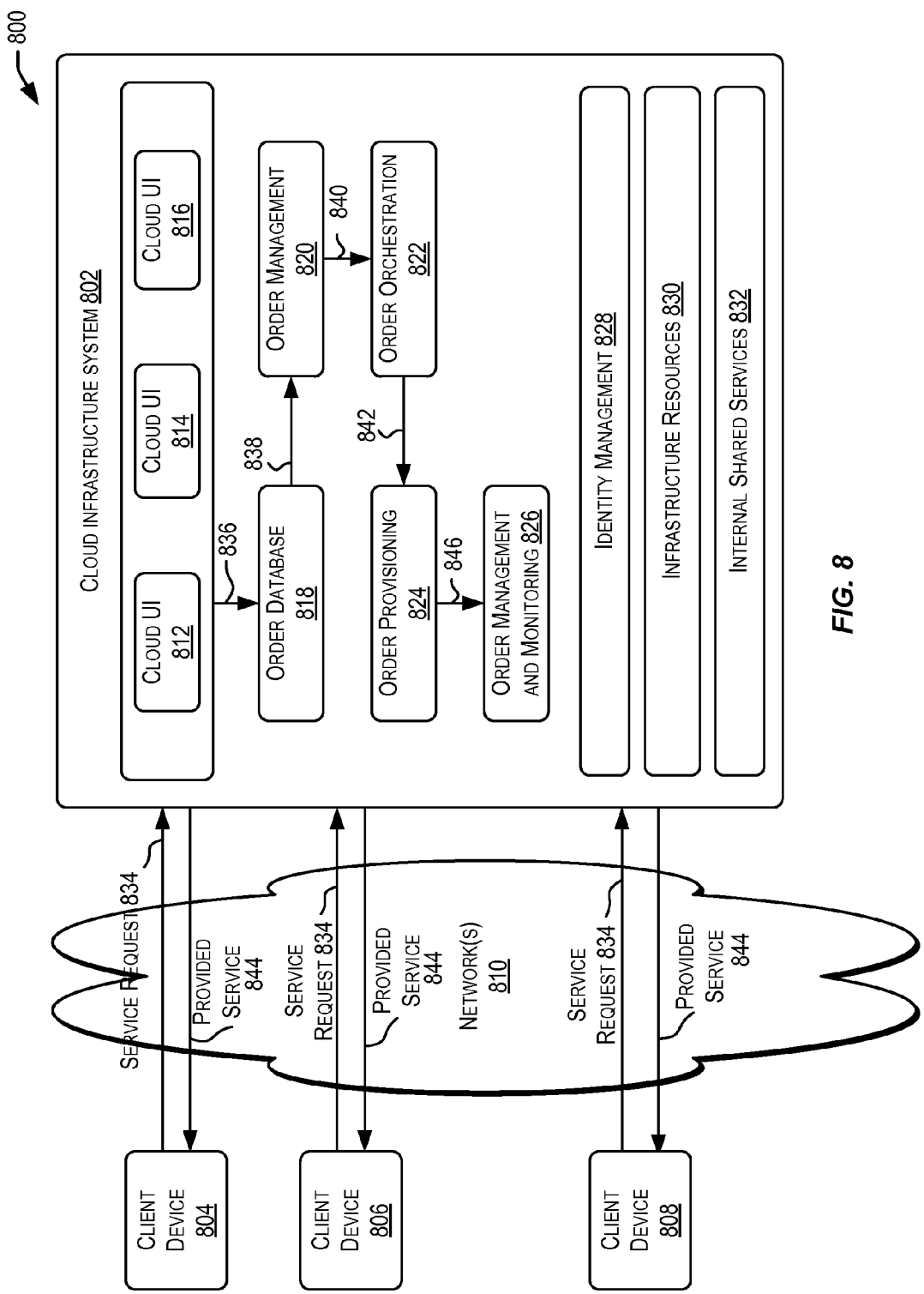
FIG. 8 is a simplified block diagram of one or more components of a system environment in which services may be offered as cloud services, in accordance with an embodiment of the present disclosure.

In some embodiments, the document analysis and modification services described above may be offered as services via a cloud environment. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for dynamically modifying documents (e.g., webpages) responsive to usage patterns. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.)

Identity management module 828 may also include the management of descriptive information about each customer and about how and by whom that descriptive information can be accessed and modified.

IX. Example Computer System

Figure 9:
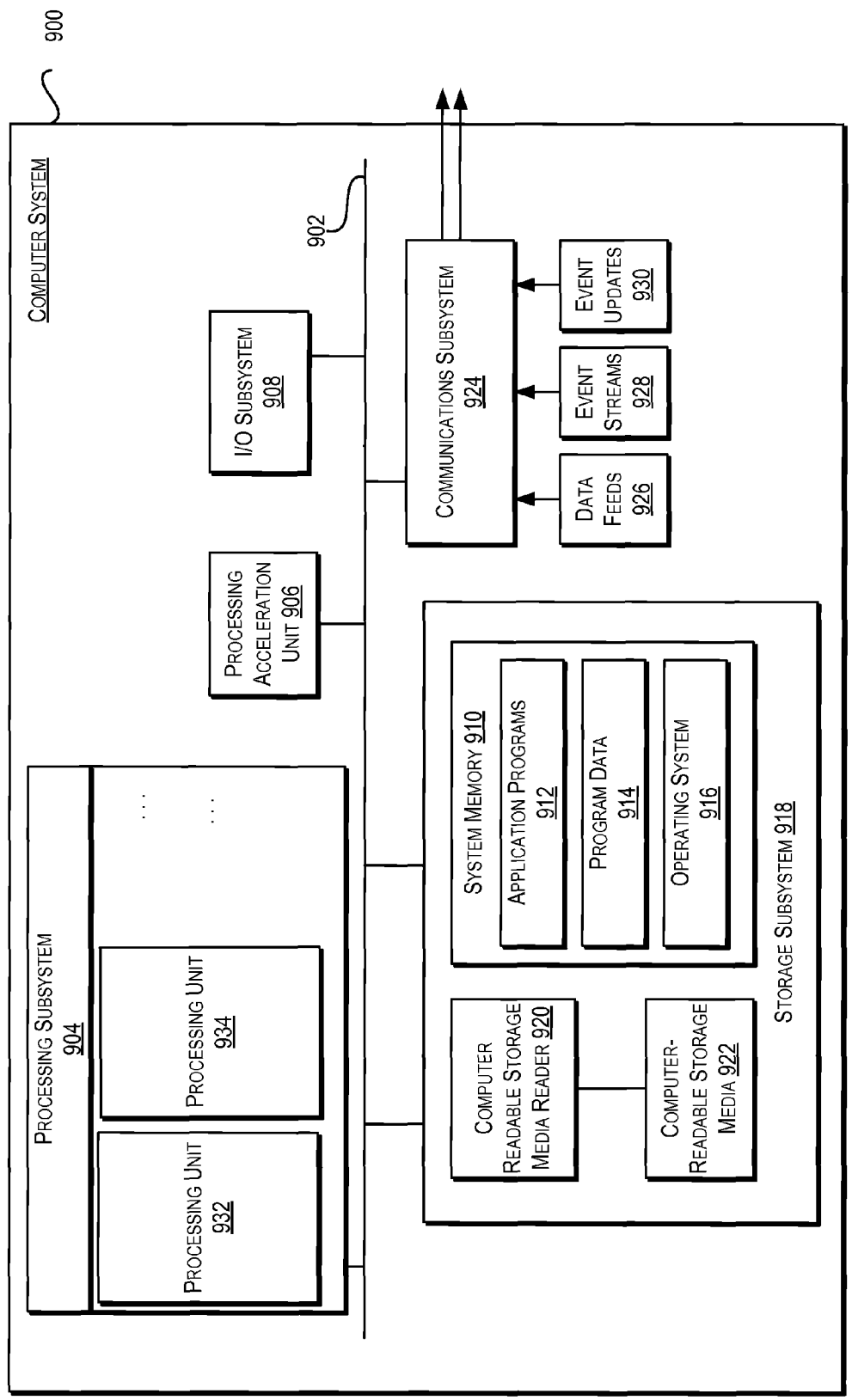
FIG. 9 illustrates an exemplary computer system that may be used to implement an embodiment of the present invention.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, update management system 102 depicted in FIG. 1 may receive user interactions information and webpage requests from client devices using communication subsystem 924. Additionally, communication subsystem 924 may be used to communicate webpages from update management system 102 to the requesting clients.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
uploading a first version of a plugin package to a shared plugin registry, the first version of the plugin package having one or more components;
receiving an indication to start a user session;
responsive to receiving the indication to start the user session, determining all available plugin packages uploaded to a plugin service, wherein the available plugin packages includes a plurality of plugin packages that includes the first version of the plugin package;
incrementing a reference count associated with each of the plurality of plugin packages;
uploading a second version of the plugin package to the shared plugin registry, wherein the second version of the plugin package has been deployed to replace the first version of the plugin package;
determining a reference count associated with the first version of the plugin package, the reference count being indicative of whether there are one or more active user sessions associated with the first version of the plugin package;
maintaining, by one or more processors, the first version of the plugin package and the second version of the plugin package in the shared plugin registry when the reference count associated with the first version of the plugin package is not zero;
determining that the user session has ended; and
responsive to determining that the user session has ended, updating the reference count associated with each of the plurality of plugin packages.

2. The method of claim 1, wherein the first version of the plugin package is continued to be made available to the user session after the second version of the plugin package is uploaded.

3. The method of claim 1, further comprising:
receiving an indication that another user session has started after the second version of the plugin package has been uploaded to the shared plugin registry; and
providing the second version of the plugin package to the other user session,
wherein the first version of the plugin package is being used in the user session concurrently as the second version of the plugin package in the other user session.

4. The method of claim 1, wherein updating the reference count associated with each of the plurality of plugin packages includes decrementing the reference count associated with the first version of the plugin package when the user session ends, and wherein the method further comprises removing any plugin packages that have a reference count of zero further in response to determining that the user session has ended.

5. The method of claim 1, wherein the second version of the plugin package includes a same component from the first version of the plugin package, the same component having the same version number, and wherein the first version of the plugin package includes a first version of a component and the second version of the plugin package includes a second version of the component.

6. The method of claim 1, further comprising:
when the reference count associated with the first version of the plugin package is zero:
determining whether the first version of the plugin package is the latest version of the plugin package; and
marking the first version of the plugin package for removal from the shared plugin registry if the first version of the plugin package is not the latest version of the plugin package.

7. The method of claim 1, further comprising:
receiving an indication that a new user session has started after the second version of the plugin package has been uploaded to the shared plugin registry;
responsive to receiving the indication that the new user session has started, determining all available plugin packages uploaded to the plugin service, wherein the available plugin packages includes the second version of the plugin package;
enabling use of the second version of the plugin package during the new user session instead of the first version; and
increasing a reference count associated with all plugin packages available at a new time that the new user session has started, wherein increasing the reference count associated with all plugin packages available at the new time includes increasing a reference count for the second version of the plugin package.

8. The method of claim 7, further comprising:
storing information identifying one or more plugin packages used during the new user session;
storing one or more timestamps associated with the one or more plugin packages, each timestamp identifying a time at which each of the plugin packages was provided for the new user session; and enabling access to the same one or more plugin packages throughout a duration of the new user session regardless of one or more additional plugin packages uploaded to the shared plugin registry at a later time to the times identified by the one or more timestamps, the one or more additional plugin packages including one or more newer versions of the one or more plugin packages.

9. The method of claim 1, further comprising:
automatically removing the first version of the package when the reference count associated with the first version of the package goes down to zero.

10. The method of claim 1, further comprising:
responsive to receiving the indication to start the user session, taking a snapshot of available plugin packages uploaded to a plugin service, wherein the plurality of plugin packages uploaded to the plugin service are determined from the snapshot, and wherein the reference count associated with each of the available plugin packages is incremented regardless of whether each of the available plugin packages is used during the user session.

11. A system comprising:
one or more processors; and
memory coupled to the one or more processors, the memory encoded with a set of instructions configured to perform a process comprising:
uploading a first version of a plugin package to a shared plugin registry, the first version of the plugin package having one or more components;
receiving an indication to start a user session;
responsive to receiving the indication to start the user session, determining all available plugin packages uploaded to a plugin service, wherein the available plugin packages includes a plurality of plugin packages that includes the first version of the plugin package;
incrementing a reference count associated with each of the plurality of plugin packages;
uploading a second version of the plugin package to the shared plugin registry, wherein the second version of the plugin package has been deployed to replace the first version of the plugin package;
determining a reference count associated with the first version of the plugin package, the reference count being indicative of whether there are one or more active user sessions associated with the first version of the plugin package;
maintaining, by the one or more processors, the first version of the plugin package and the second version of the plugin package in the shared plugin registry when the reference count associated with the first version of the plugin package is not zero;
determining that the user session has ended; and
responsive to determining that the user session has ended, updating the reference count associated with each of the plurality of plugin packages.

12. The system of claim 11,
wherein the first version of the plugin package is continued to be made available to the user session after the second version of the plugin package is uploaded.

13. The system of claim 11, wherein the set of instructions are further configured to perform the process comprising:
receiving an indication that another user session has started after the second version of the plugin package has been uploaded to the shared plugin registry; and
providing the second version of the plugin package to the other user session,
wherein the first version of the plugin package is being used in the user session concurrently as the second version of the plugin package in the other user session.

14. The system of claim 11, wherein updating the reference count associated with each of the plurality of plugin packages includes
decrementing the reference count associated with the first version of the plugin package when the user session ends, and wherein the method further comprises removing any plugin packages that have a reference count of zero further in response to determining that the user session has ended.

15. The system of claim 11, wherein the second version of the plugin package includes a same component from the first version of the plugin package, the same component having the same version number, and wherein the first version of the plugin package includes a first version of a component and the second version of the plugin package includes a second version of the component.

16. A non-transitory computer readable storage medium storing instructions that, when executed by one or more processors of a first computing device, cause the first computing device to perform operations comprising:
uploading a first version of a plugin package to a shared plugin registry, the first version of the plugin package having one or more components;
receiving an indication to start a user session;
responsive to receiving the indication to start the user session, determining all available plugin packages uploaded to a plugin service, wherein the available plugin packages includes a plurality of plugin packages that includes the first version of the plugin package;
incrementing a reference count associated with each of the plurality of plugin packages;
uploading a second version of the plugin package to the shared plugin registry, wherein the second version of the plugin package has been deployed to replace the first version of the plugin package;
determining a reference count associated with the first version of the plugin package, the reference count being indicative of whether there are one or more active user sessions associated with the first version of the plugin package;
maintaining, by the one or more processors, the first version of the plugin package and the second version of the plugin package in the shared plugin registry when the reference count associated with the first version of the plugin package is not zero;
determining that the user session has ended; and
responsive to determining that the user session has ended, updating the reference count associated with each of the plurality of plugin packages.

17. The computer readable storage medium of claim 16, wherein the first version of the plugin package is continued to be made available to the user session after the second version of the plugin package is uploaded.

18. The computer readable storage medium of claim 16, wherein the instructions further cause the first computing device to perform operations comprising:
receiving an indication that another user session has started after the second version of the plugin package has been uploaded to the shared plugin registry; and
providing the second version of the plugin package to the other user session, wherein the first version of the plugin package is being used in the user session concurrently as the second version of the plugin package in the other user session.

19. The computer readable storage medium of claim 16, wherein updating the reference count associated with each of the plurality of plugin packages includes
decrementing the reference count associated with the first version of the plugin package when the user session ends, and wherein the method further comprises removing any plugin packages that have a reference count of zero further in response to determining that the user session has ended.

20. The computer readable storage medium of claim 16, wherein the second version of the plugin package includes a same component from the first version of the plugin package, the same component having the same version number, and wherein the first version of the plugin package includes a first version of a component and the second version of the plugin package includes a second version of the component.

* * * * *

UNITED STATES PATENT AND TRADEMARK OFFICE
CERTIFICATE OF CORRECTION

PATENT NO. : 9,575,744 B2  
APPLICATION NO. : 14/866414  
DATED : February 21, 2017  
INVENTOR(S) : Katkere et al.

Page 1 of 1

It is certified that error appears in the above-identified patent and that said Letters Patent is hereby corrected as shown below:

In the Specification

In Column 11, Line 27, delete "C1v2," and insert -- C1v1, --, therefor.

In Column 19, Lines 1-2, after "networking" insert -- . --.

In Column 24, Line 46, after "etc.)" insert -- . --.

In Column 24, Lines 47-50, delete "Identity management module 828 may also include the management of descriptive information about each customer and about how and by whom that descriptive information can be accessed and modified." and insert the same on Column 24, Line 46 as a continuation of the same paragraph.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*